(12) United States Patent
Song et al.

(10) Patent No.: US 11,587,317 B2
(45) Date of Patent: Feb. 21, 2023

(54) VIDEO PROCESSING METHOD AND TERMINAL DEVICE

(71) Applicant: SZ DJI TECHNOLOGY CO., LTD., Shenzhen (CN)

(72) Inventors: Qiheng Song, Shenzhen (CN); Xinyu Li, Shenzhen (CN); Jianghui Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 237 days.

(21) Appl. No.: 16/893,156

(22) Filed: Jun. 4, 2020

(65) Prior Publication Data

US 2020/0356780 A1  Nov. 12, 2020

Related U.S. Application Data

(63) Continuation of application No. PCT/CN2018/073337, filed on Jan. 19, 2018.

(51) Int. Cl.
*G06T 7/20* (2017.01)
*G06V 20/40* (2022.01)
*G06T 7/73* (2017.01)
*G06N 20/00* (2019.01)
*B64C 39/02* (2023.01)

(52) U.S. Cl.
CPC ............ *G06V 20/41* (2022.01); *B64C 39/024* (2013.01); *G06N 20/00* (2019.01); *G06T 7/20* (2013.01); *G06T 7/74* (2017.01); *G06V 20/46* (2022.01); *B64C 2201/127* (2013.01); *G06T 2207/30241* (2013.01)

(58) Field of Classification Search
CPC .......... G06V 20/17; G06V 20/46; G06T 7/20; G06T 7/74; H04N 5/77; G06N 20/00
See application file for complete search history.

(56) References Cited

U.S. PATENT DOCUMENTS

| | | | |
|---|---|---|---|
| 8,874,429 B1 * | 10/2014 | Crosley | H04N 5/05 |
| | | | 348/14.08 |
| 8,942,542 B1 * | 1/2015 | Sherrets | H04N 21/8456 |
| | | | 386/290 |
| 9,398,350 B1 * | 7/2016 | Ong | G06F 16/7867 |
| 11,032,553 B2 * | 6/2021 | Yin | H04N 19/17 |

(Continued)

FOREIGN PATENT DOCUMENTS

| | | | |
|---|---|---|---|
| CN | 104702919 A | | 6/2015 |
| CN | 105100665 A | | 11/2015 |

(Continued)

OTHER PUBLICATIONS

The World Intellectual Property Organization (WIPO) International Search Report for PCT/CN2018/073337 dated Jun. 29, 2018 7 Pages.

*Primary Examiner* — Sam Bhattacharya
(74) *Attorney, Agent, or Firm* — Anova Law Group, PLLC

(57) ABSTRACT

A video processing method and a terminal device are provided. The video processing method includes acquiring video data, acquiring a plurality of video segments from the video data according to flight parameter information of an unmanned aerial vehicle or motion parameter information of a capturing device, and obtaining a target video by processing the plurality of video segments according to a preset parameter.

20 Claims, 4 Drawing Sheets

(56) References Cited

U.S. PATENT DOCUMENTS

| | | | | |
|---|---|---|---|---|
| 2004/0041831 A1* | 3/2004 | Zhang | ................... | G06F 16/739 |
| | | | | 707/E17.028 |
| 2005/0257240 A1 | 11/2005 | Faulkner et al. | | |
| 2011/0229032 A1* | 9/2011 | Ranganathan | ......... | G06V 20/10 |
| | | | | 382/171 |
| 2012/0249880 A1* | 10/2012 | Li | .......................... | G06T 7/251 |
| | | | | 348/700 |
| 2014/0201126 A1* | 7/2014 | Zadeh | ................... | A61B 5/165 |
| | | | | 706/52 |
| 2016/0277645 A1* | 9/2016 | Bitouk | ................... | G06V 20/49 |
| 2017/0013230 A1* | 1/2017 | Hirakawa | ............ | H04N 9/8205 |
| 2017/0127459 A1* | 5/2017 | Ye | ......................... | H04W 12/04 |
| 2017/0201714 A1* | 7/2017 | Kim | ....................... | H04N 5/265 |
| 2017/0329493 A1* | 11/2017 | Jia | ......................... | G06V 10/751 |
| 2018/0249193 A1* | 8/2018 | Zhang | ................... | H04N 21/251 |
| 2019/0104342 A1* | 4/2019 | Catalano | ............ | H04N 21/4532 |
| 2022/0046315 A1* | 2/2022 | Kouncar | ............ | H04N 21/4335 |

FOREIGN PATENT DOCUMENTS

| | | | |
|---|---|---|---|
| CN | 105493496 A | 4/2016 | |
| CN | 105519095 A | 4/2016 | |

\* cited by examiner

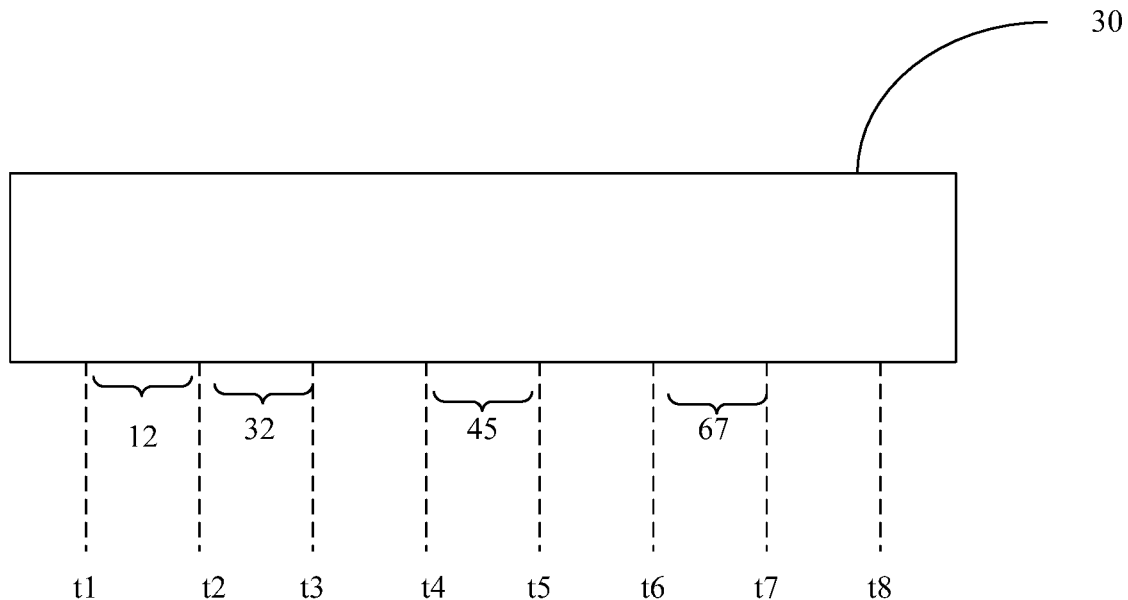

FIG. 3

```
┌─────────────────────────────────────────────────────────┐
│ According to an actual attribute of each video segment  │
│ in the plurality of video segments, determining at      │ ~ S401
│ least one target segment having an actual attribute     │
│ match a target attribute from the plurality of video    │
│ segments                                                │
└─────────────────────────────────────────────────────────┘
                            │
                            ▼
┌─────────────────────────────────────────────────────────┐
│ Obtaining the target video by processing the at least   │ ~ S402
│ one target segment                                      │
└─────────────────────────────────────────────────────────┘
```

FIG. 4

VIDEO PROCESSING METHOD AND TERMINAL DEVICE

CROSS-REFERENCE TO RELATED APPLICATION

This application is a continuation of International Application No. PCT/CN2018/073337, filed Jan. 19, 2018, the entire content of which is incorporated herein by reference.

TECHNICAL FIELD

The present disclosure relates to the field of unmanned aerial vehicle technology and, more particularly, to a video processing method and a terminal device.

BACKGROUND

In the existing technology, after recording videos using a capturing device, users may need to post-edit videos using editing software. However, the post-editing process of the videos using the editing software by the users may be complicated, resulting in low video processing efficiency.

SUMMARY

In accordance with the disclosure, a video processing method is provided in the present disclosure. The video processing method includes acquiring video data, acquiring a plurality of video segments from the video data according to flight parameter information of an unmanned aerial vehicle or motion parameter information of a capturing device, and obtaining a target video by processing the plurality of video segments according to a preset parameter.

Also in accordance with the disclosure, a terminal device is provided in the present disclosure. The terminal device includes a memory and a processor. The memory is configured to store program code, and the processor is configured to call the program code. When the program code is executed, the processor is configured to acquire video data, acquire a plurality of video segments from the video data according to flight parameter information of an unmanned aerial vehicle or motion parameter information of a capturing device, and obtain a target video by processing the plurality of video segments according to a preset parameter.

BRIEF DESCRIPTION OF THE DRAWINGS

In order to more clearly illustrate technical solutions in embodiments of the present disclosure, drawings required for describing the embodiments are briefly illustrated hereinafter. Obviously, the following drawings are merely examples for illustrative purposes according to various disclosed embodiments and are not intended to limit the scope of the present disclosure. Those skilled in the art may obtain other drawings according to the drawings of the present disclosure without any creative efforts.

FIG. 3 illustrates a schematic of video segments according to various disclosed embodiments of the present disclosure;

FIG. 4 illustrates another flow chart of a video processing method according to various disclosed embodiments of the present disclosure;

DETAILED DESCRIPTION OF THE EMBODIMENTS

The technical solutions in the embodiments of the present disclosure are clearly and completely described in the following with reference to the accompanying drawings in the embodiments of the present disclosure. It is obvious that the described embodiments are merely a part of the embodiments of the present disclosure, but not all embodiments. All other embodiments, based on the embodiments of the present disclosure, obtained by those skilled in the art without creative efforts are within the scope of the present disclosure.

It should be noted that when a component is called "fixed to" another component, it may be directly on another component or may have a centered component. When a component is considered to be "connected" to another component, it can be directly connected to another component or may have a centered component at the same time.

Unless defined otherwise, all technical and scientific terms used in the present disclosure may have the same meaning commonly understood by those skilled in the art. The terminology used in the present disclosure may be merely for the purpose of describing specific embodiments and may not be intended to limit the scope of the present disclosure. The term "and/or" as used in the present disclosure includes any and all combinations of one or more of the associated listed items.

Various embodiments of the present disclosure are described in detail with reference to the drawings hereinafter. In the case of no conflict, the following embodiments and features of the embodiments may be combined with each other.

Figure 1:
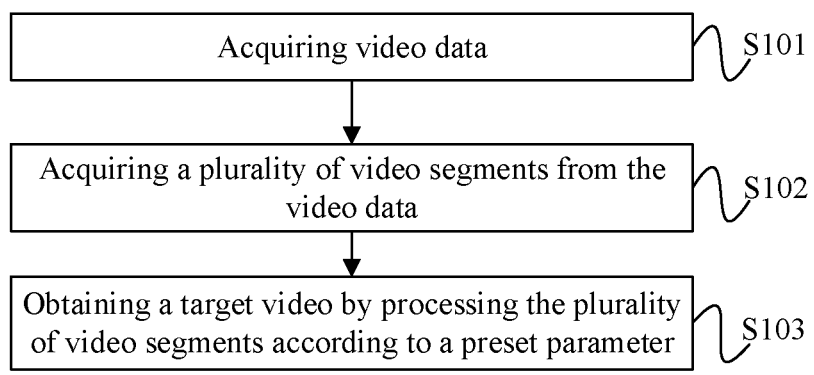
FIG. 1 illustrates a flow chart of a video processing method according to various disclosed embodiments of the present disclosure.

The embodiments of the present disclosure provide a video processing method. FIG. 1 illustrates a flow chart of a video processing method according to various disclosed embodiments of the present disclosure. As shown in FIG. 1, the method in one embodiment may include the following.

At step S101, video data may be acquired.

The execution body of one embodiment method may be a terminal device. The terminal device may include a smart phone, a tablet computer, a ground control station, a laptop computer, and the like. Optionally, the smart phone, the tablet computer, the ground control station, the laptop computer, and the like may have a capturing function. Moreover, the terminal device may be a capturing device such as a camera, a recorder and the like.

The terminal device may acquire video data, which may be recorded by the capturing device carried by an unmanned aerial vehicle or by the terminal device itself.

For example, acquiring video data may include acquiring video data captured by the capturing device.

Figure 2:
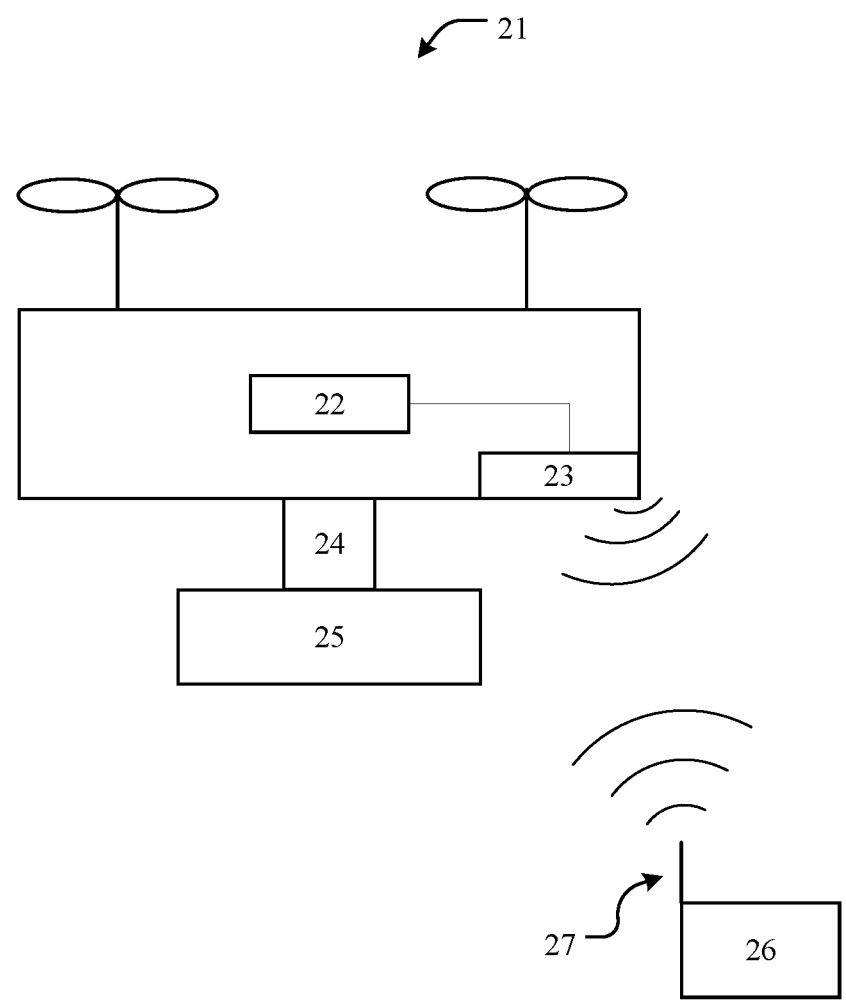
FIG. 2 illustrates a schematic of a communication system according to various disclosed embodiments of the present disclosure.

As shown in FIG. 2, an unmanned aerial vehicle 21 may include a processor 22, a communication interface 23, a gimbal 24, and a capturing device 25. The processor 22 may be a flight controller of the unmanned aerial vehicle 21 and may also be a general purpose or dedicated processor. The capturing device 25 may be mounted on the body of the unmanned aerial vehicle 21 through the gimbal 24 and may be used to capture video data. The processor 22 may acquire the video data captured by the capturing device 25 and transmit the video data captured by the capturing device 25 to a terminal device 26 on the ground through the communication interface 23. The terminal device 26 may receive the video data captured by the capturing device 25 and transmitted by the communication interface 23 through an antenna 27. The processor in the terminal device 26 may acquire the video data captured by the capturing device 25. Or the terminal device 26 itself may have a capturing function. For example, the terminal device 26 may be configured with a camera, and the processor in the terminal device 26 may acquire video data captured by the camera on the terminal device 26.

At step S102, a plurality of video segments may be acquired from the video data.

After acquiring the video data, the processor in the terminal device 26 may further acquire the plurality of video segments in the video data. One feasible implementation manner may be decomposing the video data into the plurality of video segments by the processor.

In other embodiments, the method may further include receiving flight parameter information of the unmanned aerial vehicle or motion parameter information of the capturing device itself, transmitted by the unmanned aerial vehicle, in the process of capturing the video data by the capturing device.

As shown in FIG. 2, when the capturing device 25 is in the process of capturing video data, the processor 22 may acquire the flight parameter information of the unmanned aerial vehicle 21. Optionally, the flight parameter information of the unmanned aerial vehicle may include at least one of the following: a flight speed of the unmanned aerial vehicle, an acceleration of the unmanned aerial vehicle, an attitude of the unmanned aerial vehicle, an attitude of the gimbal of the unmanned aerial vehicle, and location information of the unmanned aerial vehicle. When the unmanned aerial vehicle 21 transmits the video data captured by the capturing device 25 to the terminal device 26, the unmanned aerial vehicle 21 may also simultaneously transmit the flight parameter information of the unmanned aerial vehicle 21 in the process of capturing the video data by the capturing device 25 to the terminal device 26. That is, when the terminal device 26 receives the video data which is captured by the capturing device 25 and transmitted by the unmanned aerial vehicle 21, the terminal device 26 may also simultaneously receive the flight parameter information of the unmanned aerial vehicle 21 in the process of capturing the video data by the capturing device 25.

Or, in the process of capturing the video data by the capturing device 25, the processor 22 may further acquire the motion parameter information of the capturing device 25. The motion parameter information of the capturing device may include at least one of the following: an attitude of the capturing device, a movement speed of the capturing device, an acceleration of the capturing device, and location information of the capturing device. When the unmanned aerial vehicle 21 transmits the video data captured by the capturing device 25 to the terminal device 26, the unmanned aerial vehicle 21 may also simultaneously transmit the motion parameter information of the capturing device 25 itself in the process of capturing the video data by the capturing device 25 to the terminal device 26.

Or, the terminal device 26 itself may have a capturing function. When the processor in the terminal device 26 acquires the video data captured by the camera on the terminal device 26, the processor may also simultaneously acquire the motion parameter information of the terminal device 26 itself. For example, the motion parameter information may include one or more of the following: an attitude of the terminal device 26, a movement speed of the terminal device 26, an acceleration of the terminal device 26, and location information of the terminal device 26.

For example, acquiring the plurality of video segments from the video data may include acquiring the plurality of video segments from the video data according to the flight parameter information of the unmanned aerial vehicle or the motion parameter information of the capturing device in the process of capturing the video data by the capturing device.

As shown in FIG. 3, 30 represents the video data captured by the capturing device 25; and t1, t2, t3, t4, t5, t6, t7, and t8 respectively represent acquisition time of the flight parameter information of the unmanned aerial vehicle. Optionally, t1, t2, t3, t4, t5, t6, t7, and t8 may have equal intervals or unequal intervals, merely for illustrative description herein; and acquisition time and sampling intervals of the flight parameter information of the unmanned aerial vehicle in the process of capturing the video data by the capturing device 25 may not be limited.

Optionally, t1, t2, t3, t4, t5, t6, t7, and t8 may divide the video data 30 into the plurality of video segments. Furthermore, a plurality of high-quality video segments may be selected from the plurality of divided video segments according to the flight parameter information of the unmanned aerial vehicle in different sampling intervals. For example, in a certain sampling interval, the flight speed of the unmanned aerial vehicle is within a preset speed range, the acceleration of the unmanned aerial vehicle is within a preset acceleration range, the flight of the unmanned aerial vehicle is relatively stable, and the gimbal of the unmanned aerial vehicle is relatively stable, so the video segments in such sampling interval may be high-quality video segments. In other embodiments, based on the flight speed, acceleration, attitude of the unmanned aerial vehicle and the attitude of the gimbal, and combined with the location information of the unmanned aerial vehicle such as GPS information, acquisition information of a visual module, image frame information in the video data, and the like, the plurality of high-quality video segments may be selected from the plurality of divided video segments.

In other embodiments, as shown in FIG. 3, t1, t2, t3, t4, t5, t6, t7, and t8 respectively may further represent acquisition time of the motion parameter information of the capturing device and may divide the video data 30 into the plurality of video segments. Furthermore, the plurality of high-quality video segments may be selected from the plurality of divided video segments according to the motion parameter information in different sampling intervals.

At step S103, the plurality of video segments may be processed to obtain a target video according to a preset parameter.

Optionally, processing the plurality of video segments to obtain the target video according to the preset parameter may include the following feasible implementation manners.

One feasible implementation manner may be identifying, by using a machine learning manner, a scene corresponding to the video data, where processing the plurality of video segments to obtain the target video according to the preset parameter may include processing the plurality of video segments to obtain the target video according to the preset parameter corresponding to the scene.

As shown in FIG. 2, the terminal device 26 may identify the scene corresponding to the video data through the machine learning manner according to one or more of the information including the flight parameter information of the unmanned aerial vehicle 21, the motion parameter information of the capturing device 25, the image frame information in the video data and the like. For example, the scene corresponding to the video data may include at least one of the following: landscape, city, coast, sky, and portrait.

The terminal device 26 may acquire the preset parameter corresponding to the scene from a plurality of preset parameters stored by the terminal device 26 according to the scene corresponding to the video data identified by the machine learning. For example, the terminal device 26 may store a preset parameter corresponding to each different scene. If the terminal device 26 identifies the scene of the video data captured by the capturing device 25 to be landscape through the machine learning, the terminal device 26 may acquire the preset parameter corresponding to landscape, and process the plurality of high-quality video segments acquired in the above-mentioned steps according to the preset parameter to obtain a target video.

Another feasible implementation manner may be detecting a user scene setting operation; and determining the scene corresponding to the video data according to the detected scene setting operation, where processing the plurality of video segments to obtain the target video according to the preset parameter may include processing the plurality of video segments to obtain the target video according to the preset parameter corresponding to the scene.

For example, the user may further set the scene of the video data. For example, the user may set the scene of the video data to be landscape on the terminal device, so the terminal device 26 may acquire the preset parameter corresponding to the landscape and process the plurality of high-quality video segments acquired in the above-mentioned steps to obtain the target video according to the preset parameter.

Another feasible implementation manner may be detecting a user scene switching operation; and switching the scene according to the detected scene switching operation, where processing the plurality of video segments to obtain the target video according to the preset parameter may include processing the plurality of video segments to obtain the target video according to the preset parameter corresponding to the switched scene.

For example, the user may further switch the scene of the video data. It is assumed that the terminal device 26 identifies the scene corresponding to the video data to be landscape according to the machine learning, but the user identifies the scene corresponding to the video data to be coast, so the user may switch the scene corresponding to the video data through the terminal device, and the terminal device 26 may acquire the preset parameter corresponding to the coast and process the plurality of high-quality video segments acquired in the above-mentioned steps to obtain the target video according to the preset parameter.

In one embodiment, each preset parameter may be a set of solutions for processing the plurality of video segments. Optionally, the preset parameter may include at least one of the following: audio information such as background music, filter information, the target attribute of the video segments, transition information of the video segments, and the target duration of the target video. For example, the terminal device 26 may select at least one target segment matching the target attribute from the plurality of video segments according to the target attribute of the video segments, process the at least one target segment according to key points in the background music to obtain the target video, and perform the imaging processing on the images in the target video according to filter information, or/and transit adjacent target segments at key points according to the transition manner indicated by the transition information, or/and adjust the duration of the target video to the target duration.

In other embodiments, each information included in the preset parameter may be changed. For example, a same preset parameter may include various audio information such as background music, and the user may select a background music from the various background music; or the terminal device may select a default background music from the various background music.

In one embodiment, the video data may be acquired through the terminal device, the plurality of video segments may be acquired from the video data, and the plurality of video segments may be processed to obtain the target video according to the preset parameter. In such way, the user may not need to post-edit the video data, which may remove the tedious process of post-editing and improve the video processing efficiency.

The embodiments of the present disclosure provide a video processing method. FIG. 4 illustrates another flow chart of a video processing method according to various disclosed embodiments of the present disclosure. As shown in FIG. 4, based on the embodiments shown in FIG. 1, the preset parameter may include the target attributes of at least one video segment. The target attributes of the video segment may include the target duration of the video segment, and the target flight parameter information of the unmanned aerial vehicle corresponding to the video segment.

In the plurality of video segments obtained according to step S102, each video segment may correspond to an actual attribute, such as an actual duration of the video segment, and actual flight parameter information of the unmanned aerial vehicle corresponding to the video segment.

Processing the plurality of video segments to obtain the target video according to the preset parameter may include the following.

At step S401, at least one target segment that an actual attribute matches the target attribute may be determined from the plurality of video segments according to the actual attribute of each video segment in the plurality of video segments.

As shown in FIG. 3, it is assumed that a video segment 12 between t1 and t2, a video segment 32 between t2 and t3, a video segment 45 between t4 and t5, a video segment 67 between t6 and t7 are high-quality video segments; and the preset parameter includes target attributes of three video segments, for example, a target attribute of a first video segment, a target attribute of a second video segment, and a target attribute of a third video segment. Therefore, the terminal device may need to select three target segments that the actual attribute matches the target attribute from the video segment 12, the video segment 32, the video segment 45, and the video segment 67. For example, the actual attribute of the video segment 12 matches the target attribute of the first video segment, the actual attribute of the video segment 32 matches the target attribute of the second video segment, and the actual attribute of the video segment 45 matches the target attribute of the third video segment, so the video segment 12, the video segment 32 and the video segment 45 may be target segments respectively.

At step S402, the at least one target segment may be processed to obtain the target video.

Furthermore, the terminal device may process the video segment 12, the video segment 32 and the video segment 45 to obtain the target video.

Optionally, the preset parameter may further include audio information. Processing the at least one target segment to obtain the target video may include processing the at least one target segment to obtain the target video according to the key points in the audio information, where adjacent target segments in the target video may be transited at the key points.

For example, the terminal device may identify key music points in the audio information according to the preset parameter including an accent, a knot change sound and the like in the audio information, and the key music points may be referred to as the key points. Furthermore, the terminal device may process the video segment 12, the video segment 32 and the video segment 45 to obtain the target video according to the key points in the audio information. For example, in the target video, the video segment 12 may be adjacent to the video segment 32, the video segment 32 may be adjacent to the video segment 45. Optionally, the video segment 12 and the video segment 32, and the video segment 32 and the video segment 45 may respectively be transited at the key points in the audio information.

Optionally, processing the at least one target segment to obtain the target video according to the key points in the audio information may include the following feasible implementation manners.

One feasible implementation manner may be detecting the audio information selection operation of the user; and determining the audio information selected by the user according to the detected audio information selection operation, where processing the at least one target segment to obtain the target video according to the key points in the audio information may include processing the at least one target segment to obtain the target video according to the key points in the audio information selected by the user.

For example, the user may select the audio information in the preset parameter. For example, the preset parameter may correspond to multiple audio information, and the user may select one audio information from the multiple audio information corresponding to the preset parameter, or the user may also select favorite audio information such as background music. For example, the terminal device may detect the user selection operation on the audio information and determine the audio information selected by the user according to the selection operation, and may further identify the key points in the audio information selected by the user and process the video segment 12, the video segment 32 and the video segment 45 to obtain the target video according to the key points in the audio information selected by the user.

Another feasible implementation manner may be detecting the attribute switching operation of the audio information by the user; and determining the audio information after the attribute switching according to the detected switching operation, where processing the at least one target segment to obtain the target video according to the key points in the audio information may include processing the at least one target segment to obtain the target video according to the key points in the audio information after the attribute switching.

For example, the user may also switch the attributes of the audio information in the preset parameter. For example, the user may control the terminal device to process the video segment 12, the video segment 32, and the video segment 45 by using one complete background music to obtain the target video, and also control the terminal device to process the video segment 12, the vide segment 32 and the video segment 45 to obtain the target video by using a portion of the audio information having a relatively fast rhythm, a portion of the audio information having a relatively slow rhythm, a portion of the audio information having a relatively fast rhythm first and a relatively slow rhythm later, or a portion of the audio information having a relatively slow rhythm first and a relatively fast rhythm later.

Another feasible implementation manner may be that the preset parameter includes transition information of adjacent target segments. Processing the at least one target segment to obtain the target video according to the key points in the audio information may include processing the at least one target segment to obtain the target video according to the key points in the audio information, such that the adjacent target segments in the target video may be transited at the key points according to the transition manner indicated by the transition information.

For example, the terminal device may process the video segment 12, the video segment 32 and the video segment 45 to obtain the target video according to the key points in the audio information. The preset parameter may further include the transition information of the adjacent target segments, such that the adjacent target segments in the target video may be transited at the key points according to the transition manner indicated by the transition information. Optionally, the transition information of the adjacent target segments may be same or different, that is, the transition manner of the video segment 12 and the video segment 32 at the key points and the transition manner of the video segment 32 and the video segment 45 at the key points may be same or different.

In other embodiments, the preset parameter may further include filter information. The method may further include performing the imaging processing on images in the target video according to the filter information.

The terminal device may also perform the imaging processing on images in the target video according to the filter information included in the preset parameter. For example, different filters may correspond to different scenes, and after the filter is added to the target video, the scene content may be better expressed, and the scene expressiveness may be improved.

In some other embodiments, the preset parameter may further include the target duration of the target video. The method may further include adjusting a playing speed of the target video according to the target duration of the target video.

The terminal device may also adjust the actual duration of the target video according to the target duration of the target video. For example, the terminal device may match the actual duration with the target duration of the target video through adjusting the playing speed of the target video, for example, adjusting the playing speed of the target video to be fast first and slow later, or slow first and fast later.

Optionally, adjusting the playing speed of the target video according to the target duration of the target video may include adjusting the playing speed of at least one target segment in the target video according to the target duration of the target video.

For example, the target video is composed of the video segment 12, the video segment 32 and the video segment 45. The terminal device may adjust the playing speed of at least one of the video segment 12, the video segment 32 and the video segment 45. For example, the terminal device may adjust the playing speed of at least one of the video segment 12, the video segment 32 and the video segment 45 to be fast first and slow later or slow first and fast later, such that the actual duration of the target video may match the target duration of the target video.

In one embodiment, at least one target segment that the actual attribute matches the target attribute may be determined from the plurality of the video segments according to the actual attribute of each video segment in the plurality of the video segments; at least one target segment may be processed to obtain the target video according to the key points of the background music and the imaging processing may be performed on the images in the target video according to filter information; or/and the adjacent target segments may be transited at the key points according to the transition manner indicated by the transition information; or/and the duration of the target video may be adjusted to the target duration, which may improve the processing effect of the video data and the user experience.

Figure 5:
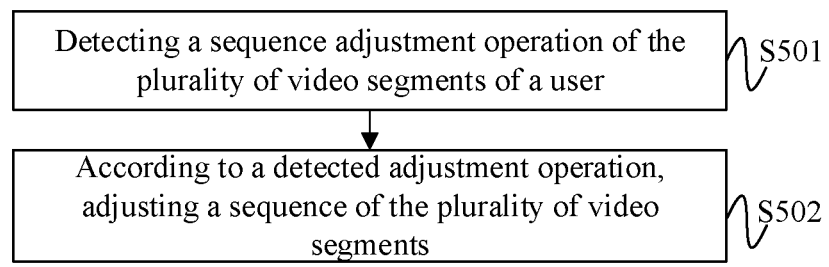
FIG. 5 illustrates another flow chart of a video processing method according to various disclosed embodiments of the present disclosure.

The embodiments of the present disclosure provide a video processing method. FIG. 5 illustrates another flow chart of a video processing method according to various disclosed embodiments of the present disclosure.

As shown in FIG. 5, based on the above-mentioned embodiments, the video processing method may further include the following.

At step S501, an adjustment operation of the sequence of the plurality of video segments by the user may be detected.

As shown in FIG. 3, it is assumed that the video segment 12 between t1 and t2, the video segment 32 between t2 and t3, the video segment 45 between t4 and t5, and the video segment 67 between t6 and t7 are high-quality video segments. The terminal device may process the video segment 12, the video segment 32, the video segment 45, and the video segment 67 to obtain the target video according to the preset parameter.

In one embodiment, the user may also adjust the arrangement sequence of the video segment 12, the video segment 32, the video segment 45, and the video segment 67. For example, an interactive interface may be displayed on the display screen of the terminal device, and the user may adjust positions of the video segment 12, the video segment 32, the video segment 45, and the video segment 67, thereby adjusting the arrangement sequence.

At step S502, the sequence of the plurality of video segments may be adjusted according to the detected adjustment operation.

The terminal device may adjust the arrangement sequence of the video segment 12, the video segment 32, the video segment 45, and the video segment 67 according to the user adjustment operation. For example, the arrangement sequence after the adjustment may be the video segment 32, the video segment 67, the video segment 12, and the video segment 45, sequentially.

The processing of the plurality of video segments to obtain the target video according to the preset parameter may include processing of the plurality of video segments after the sequence adjustment to obtain the target video according to the preset parameter.

For example, the terminal device may process the video segment 32, the video segment 67, the video segment 12 and the video segment 45 after the sequence adjustment to obtain the target video according to the preset parameter. The processing procedure may be the same as the above-mentioned embodiments, which may not be described in detail herein.

In addition, the method may further include encoding the target video to obtain an encoded target video according to video parameters corresponding to the target video, and transmitting the encoded target video to a server.

The terminal device may further encode the target video to obtain the encoded target video using the video parameters corresponding to the target video such as bit rate, frame rate, resolution, speed, format, quality and the like. Optionally, the video parameter corresponding to each scene may be fixed or adjustable. After the terminal device encodes the target video, the user may share the encoded target video on social media through a button or key on the terminal device. For example, after detecting an uploading button or key operation, the terminal device may transmit the encoded target video to the server corresponding to the social media.

Moreover, in other embodiments, the method may further include storing the encoded target video locally. For example, after the terminal device encodes the target video, the user may store the encoded target video in the terminal device locally through the terminal device. For example, after detecting the storing button or key operation, the terminal device may store the encoded target video in the terminal device locally.

In one embodiment, the adjustment operation of the sequence of the plurality of video segments by the user may be detected through the terminal device; the sequence of the plurality of video segments may be adjusted according to the detected adjustment operation; and the plurality of video segments after the sequence adjustment may be processed to obtain the target video according to the preset parameter, which may improve the processing flexibility of the video segments. Moreover, after the terminal device edits the target video, the user may control the terminal device to immediately transmit the target video to the server for sharing, thereby implementing the instant capturing and uploading of the video data and further improving the user experience.

Figure 6:
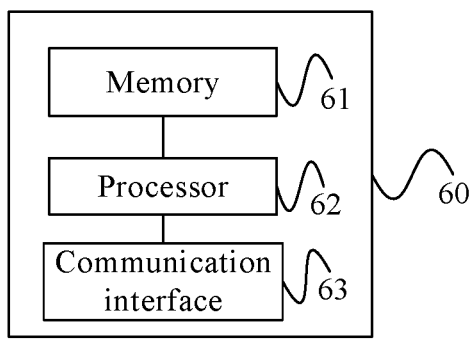
FIG. 6 illustrates a structural schematic of a terminal device according to various disclosed embodiments of the present disclosure.

The embodiments of the present disclosure provide a terminal device. FIG. 6 illustrates a structural schematic of a terminal device according to various disclosed embodiments of the present disclosure. As shown in FIG. 6, a terminal device 60 may include a memory 61 and a processor 62. The memory 61 may be configured to store program code, and the processor 62 may be configured to call the program code. When the program code is executed, the processor 62 may be configured to implement the following operations: acquiring video data; acquiring a plurality of video segments from the video data; and obtaining a target video by processing the plurality of video segments according to a preset parameter.

Optionally, the terminal device 60 may further include a communication interface 63. The communication interface 63 may be configured to receive the video data captured by the capturing device and transmitted by the unmanned aerial vehicle. When acquiring the video data, the processor 62 may be configured to, for example, acquire the video data captured by the capturing device through the communication interface 63. The communication interface 63 may further be configured to, for example, receive flight parameter information of the unmanned aerial vehicle in the process of capturing the video data by the capturing device, which may be transmitted by the unmanned aerial vehicle. When acquiring the plurality of video segments from the video data, the processor 62 may be configured to, for example, acquire the plurality of video segments from the video data according to the flight parameter information of the unmanned aerial vehicle in the process of capturing the video data by the capturing device.

Optionally, the flight parameter information of the unmanned aerial vehicle may include at least one of the following: a flight speed of the unmanned aerial vehicle, an acceleration of the unmanned aerial vehicle, an attitude of the unmanned aerial vehicle, an attitude of the gimbal of the unmanned aerial vehicle, and location information of the unmanned aerial vehicle.

Optionally, the terminal device 60 may be a camera with the processor. When the program code is executed, the terminal device 60 may further be configured to implement the following operations: receiving the motion parameter information of the capturing device itself and acquiring the plurality of video segments from the video data according to the motion parameter information of the capturing device.

Optionally, the motion parameter information of the capturing device may include at least one of the following: an attitude of the capturing device, a movement speed of the capturing device, an acceleration of the capturing device, and location information of the capturing device.

Optionally, the processor 62 may further be configured to identify a scene corresponding to the video data by using a machine learning manner. When processing the plurality of video segments to obtain the target video according to the preset parameter, the processor 62 may be configured to, for example, process the plurality of video segments to obtain the target video according to the preset parameter corresponding to the scene.

Optionally, the processor 62 may further be configured to detect a user scene setting operation and determine the scene corresponding to the video data according to the detected scene setting operation. When processing the plurality of video segments to obtain the target video according to the preset parameter, the processor 62 may be configured to, for example, process the plurality of video segments to obtain the target video according to the preset parameter corresponding to the scene.

Optionally, the processor 62 may further be configured to detect a user scene switching operation and switch the scene according to the detected scene switching operation. When processing the plurality of video segments to obtain the target video according to the preset parameter corresponding to the scene, the processor 62 may be configured to, for example, process the plurality of video segments to obtain the target video according to the preset parameter corresponding to the switched scene.

Optionally, the preset parameter may include the target attributes of at least one video segment.

Optionally, when processing the plurality of video segments to obtain the target video according to the preset parameter, the processor 62 may be configured to, for example, determine at least one target segment that an actual attribute matches the target attribute from the plurality of video segments according to the actual attribute of each video segment in the plurality of video segments; and the processor 62 may further be configured to process the at least one target segment to obtain the target video.

Optionally, the preset parameter may further include audio information. When processing the at least one target segment to obtain the target video, the processor 62 may be configured to, for example, process the at least one target segment to obtain the target video according to key points in the audio information, where the transition of adjacent target segments in the target video may be performed at the key points.

Optionally, the processor 62 may be configured to detect the audio information selection operation of the user and determine the audio information selected by the user according to the detected audio information selection operation. When processing the at least one target segment to obtain the target video according to the key points in the audio information, the processor 62 may be configured to, for example, process the at least one target segment to obtain the target video according to the key points in the audio information selected by the user.

Optionally, the processor 62 may be configured to detect the attribute switching operation of the audio information of the user and determine the audio information after the attribute switching according to the detected switching operation. When processing the at least one target segment to obtain the target video according to the key points in the audio information, the processor 62 may be configured to, for example, process the at least one target segment to obtain the target video according to the key points in the audio information after the attribute switching.

Optionally, the preset parameter may further include transition information of the adjacent target segments. When processing the at least one target segment to obtain the target video according to the key points in the audio information, the processor 62 may be configured to, for example, process the at least one target segment to obtain the target video according to the key points in the audio information, such that the transition of the adjacent target segments in the target video may be performed at the key points according to the transition manner indicated by the transition information.

Optionally, the preset parameter may further include filter information. The processor 62 may further be configured to perform the imaging processing on images in the target video according to the filter information.

Optionally, the preset parameter may further include the target duration of the target video. The processor 62 may further be configured to adjust the playing speed of the target video according to the target duration of the target video.

Optionally, when adjusting the playing speed of the target video according to the target duration of the target video, the processor 62 may be configured to, for example, adjust the playing speed of at least one target segment in the target video according to the target duration of the target video.

Optionally, the processor 62 may further be configured to detect the adjustment operation of the sequence of the plurality of video segments by the user and adjust the sequence of the plurality of video segments according to the detected adjustment operation. When processing the plurality of video segments to obtain the target video according to the preset parameter, the processor 62 may be configured to, for example, process the plurality of video segments after the sequence adjustment to obtain the target video according to the preset parameter.

Optionally, the processor 62 may further be configured to encode the target video to obtain the encoded target video according to video parameters corresponding to the target video. The communication interface 63 may further be configured to transmit the encoded target video to the server.

Optionally, the processor 62 may further be configured to store the encoded target video locally.

The principles and implementations of the terminal device provided by the embodiments of the present disclosure may be similar to the embodiments shown in FIG. 1, FIG. 4 and FIG. 5, which may not be described in detail herein.

In one embodiment, the video data may be acquired through the terminal device, the plurality of video segments may be acquired from the video data, and the plurality of video segments may be processed to obtain the target video according to the preset parameter. In such way, the user may not need to post-edit the video data, which may remove the tedious process of post-editing and improve the video processing efficiency.

In some embodiments provided by the present disclosure, it should be understood that the disclosed systems, devices, and methods may be implemented in other manners. For example, the device embodiments described above are merely illustrative. For example, the division of the unit is only a logical function division. In actual implementations, there may be other division manners. For example, multiple units or components may be combined or may be integrated into another system, or some features may be ignored or not executed. In addition, the mutual coupling, direct coupling or communication connection shown or discussed in the above-mentioned embodiments may be the indirect coupling or communication connection through certain interfaces, devices or units, and may be in electrical, mechanical or other forms.

The units described as separate components may or may not be physically separated, and the components displayed as units may or may not be physical units, that is, may be located in one location, or may be distributed to multiple network units. Some or all of the units may be selected according to actual needs to achieve the purpose of the solution of the embodiments.

In addition, each functional unit in each embodiment of the present disclosure may be integrated into one processor, or each unit may be physically separated, or two or more units may be integrated into one unit. The above-mentioned integrated unit may be implemented in the form of hardware or in the form of a combination of hardware and a software functional unit.

The above-mentioned integrated unit implemented in the form of the software functional unit may be stored in a computer-readable storage medium. The above-mentioned software functional unit may be stored in a storage medium and include a plurality of instructions for enabling a computer device (which may be a personal computer, a server, or a network device) or a processor to execute certain steps of the methods described in the embodiments of the present disclosure. The above-mentioned storage media may include U disks, mobile hard disks, read-only memory (ROM), random access memory (RAM), magnetic disks, compact discs, and other various media that can store the program code.

Those skilled in the art may clearly understand that for the convenience and brevity of the description, the above-mentioned division of the functional modules may be merely used as an example. In practical applications, the above-mentioned functions may be allocated by different functional modules according to requirements. The internal structure of the device may be divided into different functional modules to complete all or part of the functions described above. For the specific working process of the device described above, reference may be made to the corresponding process in the above-mentioned method embodiments, and details may not be described in detail herein.

It should be finally explained that the above-mentioned embodiments are merely used to illustrate the technical solutions of the present disclosure but are not intended to limit the technical solutions. Although the present disclosure has been described in detail with reference to the above-mentioned embodiments, those skilled in the art should understand that the technical solutions described in the above-mentioned embodiments may be modified, or some or all of the technical features may be equivalently replaced; and these modifications or replacements do not leave the essence of the corresponding technical solutions outside the scope of the technical solutions of the embodiments of the present disclosure.

What is claimed is:

1. A video processing method, comprising:
   acquiring video data;
   acquiring a plurality of video segments from the video data according to flight parameter information of an unmanned aerial vehicle or motion parameter information of a capturing device;
   identifying a scene corresponding to the video data; and
   obtaining a target video by processing the plurality of video segments according to a preset parameter corresponding to the identified scene, including at least one of:
      adding a background music to the plurality of video segments according to the identified scene;
      adjusting a playing duration of the plurality of video segments according to the identified scene; or
      editing a transition effect of the plurality of video segments according to the identified scene.

2. The method according to claim 1, wherein:
   acquiring the video data includes acquiring video data captured by the capturing device, the method further including:
      receiving the flight parameter information of the unmanned aerial vehicle or the motion parameter information of the capturing device, transmitted by the unmanned aerial vehicle, in a process of capturing the video data by the capturing device; and
   acquiring the plurality of video segments from the video data according to the flight parameter information of the unmanned aerial vehicle or the motion parameter information of the capturing device includes:
      acquiring the plurality of video segments from the video data according to the flight parameter information of the unmanned aerial vehicle or the motion parameter information of the capturing device in the process of capturing the video data by the capturing device.

3. The method according to claim 2, wherein:
   the flight parameter information of the unmanned aerial vehicle includes at least one of a flight speed of the unmanned aerial vehicle, an acceleration of the unmanned aerial vehicle, an attitude of the unmanned aerial vehicle, an attitude of a gimbal of the unmanned aerial vehicle, or location information of the unmanned aerial vehicle; and
   the motion parameter information of the capturing device includes at least one of an attitude of the capturing device, a movement speed of the capturing device, an acceleration of the capturing device, or location information of the capturing device.

4. The method according to claim 1, wherein:
   the preset parameter includes target attributes of at least one video segment; and
   obtaining the target video by processing the plurality of video segments according to the preset parameter further includes:
      according to an actual attribute of each video segment in the plurality of video segments, determining, from the plurality of video segments, at least one target segment having an actual attribute matching a target attribute; and
      obtaining the target video by processing the at least one target segment.

5. The method according to claim 4, wherein:
the preset parameter further includes audio information; and
obtaining the target video by processing the at least one target segment includes:
  obtaining the target video by processing the at least one target segment according to key points in the audio information, wherein a transition of adjacent target segments in the target video is performed at the key points.

6. The method according to claim 5, wherein:
the preset parameter further includes transition information of the adjacent target segments; and
obtaining the target video by processing the at least one target segment according to the key points in the audio information includes:
  obtaining the target video by processing the at least one target segment according to the key points in the audio information, such that the transition of the adjacent target segments in the target video is performed at the key points according to a transition manner indicated by the transition information.

7. The method according to claim 4, wherein:
the preset parameter further includes filter information; and
the method further includes performing imaging processing on images in the target video according to the filter information.

8. The method according to claim 7, wherein:
the preset parameter further includes a target duration of the target video; and
the method further includes adjusting a playing speed of the target video according to the target duration of the target video.

9. The method according to claim 1, further including:
detecting a sequence adjustment operation of the plurality of video segments of a user;
adjusting a sequence of the plurality of video segments according to the detected adjustment operation; and
obtaining the target video by processing the plurality of video segments according to the preset parameter includes:
  obtaining the target video by processing the plurality of video segments after the sequence adjustment according to the preset parameter.

10. The method according to claim 1, further comprising:
dividing the video data into the plurality of video segments; and
selecting one or more of the plurality of video segments captured with a flight speed of the unmanned aerial vehicle within a preset speed range or with an acceleration of the unmanned aerial vehicle within a preset acceleration range.

11. The method according to claim 1, further comprising:
detecting a user scene switching operation and switching the scene corresponding to the video data according to the user scene switching operation; and
obtaining the target video by processing the plurality of video segments according to the preset parameter corresponding to the switched scene.

12. A terminal device, comprising:
a memory and a processor; wherein:
  the memory is configured to store program code;
  the processor is configured to call the program code; and
  when the program code is executed, the processor is configured to:
    acquire video data;
    acquire a plurality of video segments from the video data according to flight parameter information of an unmanned aerial vehicle or motion parameter information of a capturing device;
    identify a scene corresponding to the video data; and
    obtain a target video by processing the plurality of video segments according to a preset parameter corresponding to the identified scene, including at least one of:
      adding a background music to the plurality of video segments according to the identified scene;
      adjusting a playing duration of the plurality of video segments according to the identified scene; or
      editing a transition effect of the plurality of video segments according to the identified scene.

13. The device according to claim 12, further including:
a communication interface;
wherein:
  the communication interface is configured to receive the video data captured by a capturing device and transmitted by an unmanned aerial vehicle;
  the processor is further configured to acquire the video data captured by the capturing device through the communication interface;
  the communication interface is further configured to receive flight parameter information of the unmanned aerial vehicle or the motion parameter information of the capturing device itself, transmitted by the unmanned aerial vehicle, in a process of capturing the video data by the capturing device; and
  the processor is further configured to acquire the plurality of video segments from the video data according to the flight parameter information of the unmanned aerial vehicle or the motion parameter information of the capturing device in the process of capturing the video data by the capturing device.

14. The device according to claim 13, wherein:
the flight parameter information of the unmanned aerial vehicle includes at least one of a flight speed of the unmanned aerial vehicle, an acceleration of the unmanned aerial vehicle, an attitude of the unmanned aerial vehicle, an attitude of a gimbal of the unmanned aerial vehicle, and location information of the unmanned aerial vehicle; and
the motion parameter information of the capturing device itself includes at least one of an attitude of the capturing device, a movement speed of the capturing device, an acceleration of the capturing device, and location information of the capturing device.

15. The device according to claim 12, wherein:
the preset parameter includes target attributes of at least one video segment; and
the processor is further configured to:
  according to an actual attribute of each video segment in the plurality of video segments, determine, from the plurality of video segments, at least one target segment having an actual attribute matching a target attribute; and
  obtain the target video by processing the at least one target segment.

16. The device according to claim 15, wherein:

the preset parameter further includes audio information; and the processor is further configured to:

obtain the target video by processing the at least one target segment according to key points in the audio information, wherein a transition of adjacent target segments in the target video is performed at the key points.

17. The device according to claim 16, wherein:

the preset parameter further includes transition information of the adjacent target segments; and the processor is further configured to:

obtain the target video by processing the at least one target segment according to the key points in the audio information, such that the transition of the adjacent target segments in the target video is performed at the key points according to a transition manner indicated by the transition information.

18. The device according to claim 15, wherein:

the preset parameter further includes filter information; and the processor is configured to perform imaging processing on images in the target video according to the filter information.

19. The device according to claim 18, wherein:

the preset parameter further includes a target duration of the target video; and the processor is configured to adjust a playing speed of the target video according to the target duration of the target video.

20. The device according to claim 12, wherein:

the processor is further configured to:

detect a sequence adjustment operation of the plurality of video segments of a user;

adjust a sequence of the plurality of video segments according to the detected adjustment operation;

obtain the target video by processing the plurality of video segments after the sequence adjustment according to the preset parameter.

* * * * *